UNITED STATES PATENT OFFICE

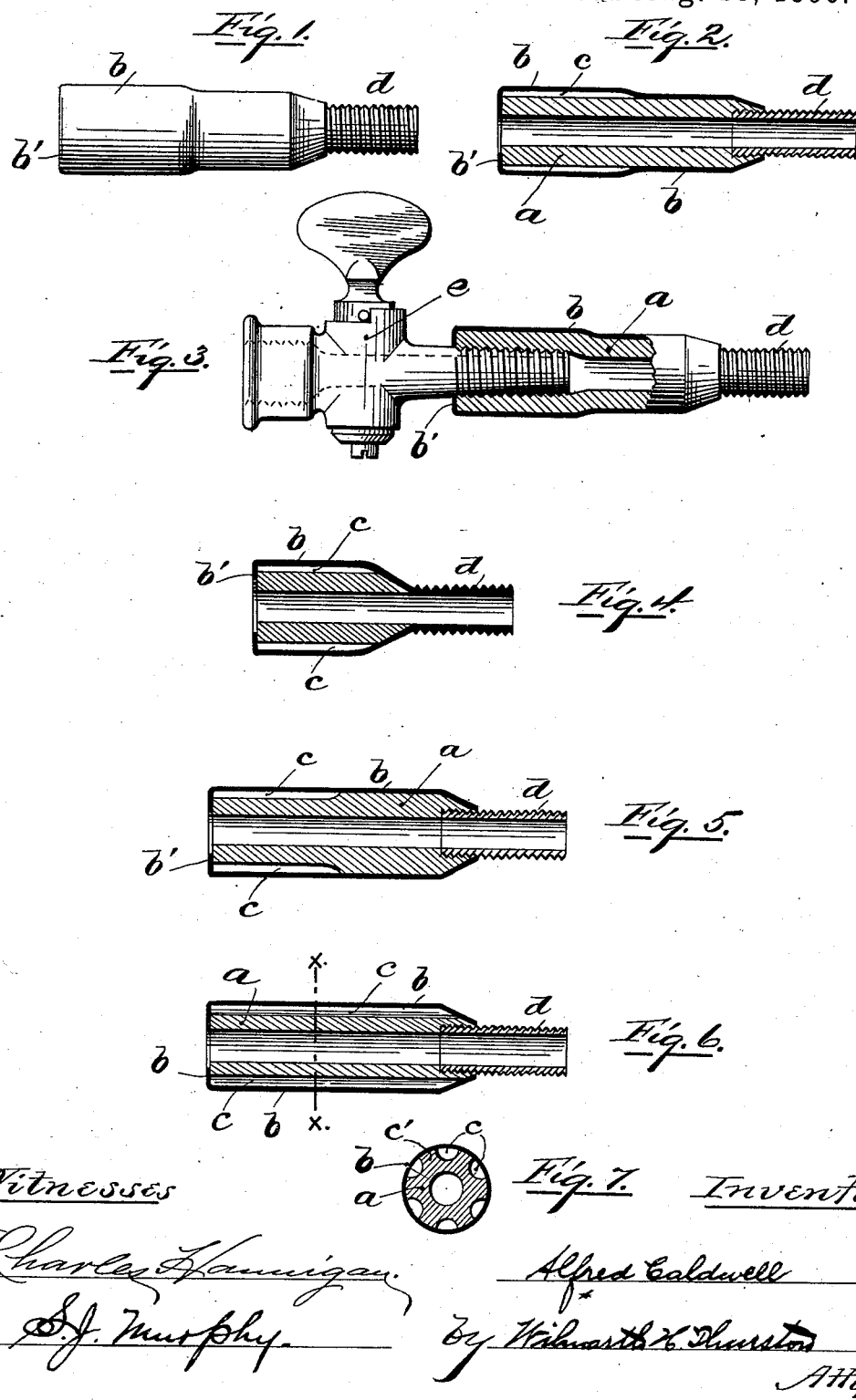
(No Model.)
A. CALDWELL.
GAS TUBE TIP.
No. 566,136. Patented Aug. 18, 1896.

ALFRED CALDWELL, OF PROVIDENCE, RHODE ISLAND.

GAS-TUBE TIP.

SPECIFICATION forming part of Letters Patent No. 566,136, dated August 18, 1896.

Application filed August 9, 1894. Serial No. 519,789. (No model.)

*To all whom it may concern:*

Be it known that I, ALFRED CALDWELL, of the city and county of Providence, in the State of Rhode Island, have invented certain new and useful Improvements in Gas-Tube Tips; and I do hereby declare the following specification, taken in connection with the accompanying drawings, forming a part of the same, to be a full, clear, and exact description thereof.

A flexible gas-tube is ordinarily provided with some form of tip for connecting said tube to a supply-nipple or other connection. The tip now commonly employed for this purpose is a tip or socket composed wholly of rubber. The advantage of using such a rubber tip is that it is self-adjustable to nipples or connections of varying sizes. It has been found in practice, however, that while these rubber tips possess this advantage of adjustability, they possess on the other hand certain disadvantages which render them undesirable and in fact at times actually unsafe. Thus such a rubber tip is liable in use to split or crack, so as to cause leakage, and there have been many cases where such a tip has given out suddenly and to such an extent as to cause the tip to fall bodily away from the nipple or connection, thereby permitting a full discharge of gas into the room or apartment. Such an accident occurring at night would be very likely to be attended with serious results. This tendency of the rubber tip to split and crack is very much increased by the fact that the rubber composing the same is exposed to the action of the atmosphere, which in connection with the action of the gas causes the rubber to deteriorate with greater or less rapidity, and thereby lose its life or holding quality.

The object of the present invention is to provide a tip for gas-tubes which shall not only possess the advantage of being adjustable to varying sizes of nipples or connections, but which shall also be practically protected against the action of the atmosphere and be much stronger and more durable than the rubber tips now commonly employed.

To that end the invention consists, primarily, in a tip composed of an inner tube of rubber and an outer surrounding tube of some comparatively rigid material, such as metal, the construction of the two tubes being such as to leave a space or spaces between them for a greater or less portion of either their length or their circumference, said space or chamber extending to the extreme entrance end of said inner tube, whereby the rubber tube will be free to be expanded within the inclosing tube to a greater or less degree.

The invention also consists in certain combinations and arrangements of parts hereinafter described and claimed.

Referring to the drawings, Figure 1 is a plan view of a tip embodying my improvement. Fig. 2 is a central longitudinal section of the same. Fig. 3 is a view, partly in section, showing the tip applied to a connection. Figs. 4, 5, and 6 are central longitudinal sections of various modifications of my improved tip, and Fig. 7 is a section on the line *x x* of Fig. 6.

In all the various forms shown in the drawings the tip is composed of a rubber tube *a* and a surrounding tube *b*, (the latter tube being preferably of metal,) with a space or spaces *c* normally existing between the outside of the inner tube and the inside of the outer tube. In the preferred form of construction shown in Figs. 1, 2, and 3 this space *c* is an annular space extending entirely around the rubber tube *a* for a portion of its length, this arrangement being secured by constructing the outer tube *b* of different diameters at different portions of its length. Thus said outer tube is made for a portion of its length of substantially the same interior diameter as the exterior diameter of the rubber tube *a*, and so that for such portion of its length the rubber tube will snugly fit the outer tube, leaving no space between them, while the remainder of the outer tube is made of larger diameter, and so as to leave an annular space between the interior of said outer tube and the exterior of the inclosed rubber tube. A screw-coupling *d* is screwed into one end of the rubber tube, and preferably the corresponding end of the outer tube is tapered or of frusto-conical form, as shown in Fig. 2. Preferably also the opposite end of the outer tube is formed with an inwardly-turned annular flange *b'*, which will serve to prevent the rubber tube from being pulled out of its inclosing tube in removing the tip from a nipple or connection.

Fig. 3 represents the tip of Fig. 1 applied to a stop-cock connection e. As will be seen, the space or chamber c permits an expansion of that end of the rubber tube a, and thus enables it to be applied to connections of varying size, including connections the exterior diameter of which is materially larger than the normal bore of the rubber tube.

The tip shown in Fig. 4 is a short tip, and in this form the space c extends practically the entire length of the rubber tube. In the tip shown in this figure, also, the screw-coupling d is represented as formed integral with or attached to the outer tube b instead of being secured to the rubber tube.

The tip shown in Fig. 5 is substantially the same as the tip shown in Figs. 1 and 2, except that the annular space c is formed by reducing the exterior diameter of the rubber tube a for a portion of its length instead of increasing the interior diameter of the corresponding portion of the outer tube, as in Figs. 1 and 2.

In the form of tip shown in Figs. 6 and 7 a series of spaces c is provided instead of a single annular space, as in the other forms. This series of spaces is produced by forming the exterior of the rubber tube a with a series of corrugations extending lengthwise of said tube, thereby forming a series of chambers c and a series of intermediate projections c'. Preferably the exterior diameter of the rubber tube a, measuring through two of the projections c', is substantially the same in this construction as the interior diameter of the outer tube, and so that when the rubber tube is inserted in place the ends of the projections will bear against the inside of the outer tube. There will thus be formed a series of spaces or chambers c, as shown in Fig. 7, which will serve to permit the expansion of the rubber tube in applying the tip to a nipple or connection. In the form shown in Fig. 6 the corrugations and chambers are represented as extending practically the entire length of the rubber tube. This is not necessary, however, and if desired they may be arranged to extend only a portion of the length of said tube.

A tip constructed in any of the forms above described will be self-adjustable and adapted for application to nipples or connections of varying sizes. In addition to this, it will be seen that not only is the rubber portion of the tip practically protected from the action of the atmosphere, thereby greatly lessening the liability of the rubber tube to split or crack, but when the tip is applied to a nipple or connection the rubber portion will be firmly clamped between the nipple on the one side and the surrounding outer tube on the other, thus insuring a gas-tight connection or joint, and practically preventing any injurious leakage even if a split or crack should happen to occur in the rubber tube.

What I claim as my invention, and desire to secure by Letters Patent, is—

1. A tip for gas-tubes comprising an inner tube of rubber and an outer surrounding tube of comparatively rigid material, with a space or chamber between the two tubes, said space or chamber extending to the extreme entrance end of said inner tube as and for the purpose specified.

2. A tip for gas-tubes comprising an inner tube of rubber and an outer surrounding tube of comparatively rigid material, said inner and outer tubes being, as to their exterior and interior diameters respectively, substantially the same for a portion of their length, but of different diameters during the remainder of their length, whereby a space or chamber will be formed between them, extending to the extreme entrance end of said inner tube substantially as described.

3. A tip for gas-tubes comprising an inner tube of rubber and an outer surrounding tube of comparatively rigid material, said inner tube being of substantially the same exterior diameter throughout its cylindrical portion, and said outer tube being for a portion of its length of an interior diameter substantially the same as the exterior diameter of the inner tube, and during the remainder of its length of a somewhat larger interior diameter, whereby a space or chamber will be formed between said tubes extending to the extreme entrance end of said inner tube, substantially as described.

4. A tip for gas-tubes comprising an inner tube of rubber and an outer surrounding tube of comparatively rigid material, the interior diameter of said outer tube being somewhat greater than the exterior diameter of said inner tube at its entrance end, said outer tube being provided at one end with an inturned annular flange, substantially as described.

ALFRED CALDWELL.

Witnesses:
W. H. THURSTON,
S. J. MURPHY.